United States Patent [19]

Ackermann et al.

[11] 4,325,693
[45] * Apr. 20, 1982

[54] DEVICE FOR HEATING OPEN MELTING BATHS

[75] Inventors: Werner Ackermann, Siegen-Trupbach; Frohmut Vollhardt, Siegen-Bürbach, both of Fed. Rep. of Germany

[73] Assignee: SAG Siegener AG, Siegen-Gesweid, Fed. Rep. of Germany

[*] Notice: The portion of the term of this patent subsequent to Jun. 10, 1997, has been disclaimed.

[21] Appl. No.: 40,435

[22] Filed: May 18, 1979

[30] Foreign Application Priority Data

May 22, 1978 [DE] Fed. Rep. of Germany ....... 2822253

[51] Int. Cl.³ .............................. F27B 3/00; F26B 3/00
[52] U.S. Cl. .................................... 432/195; 432/210; 65/346; 373/30
[58] Field of Search ................. 126/343.5 R, 343.5 A, 126/360 R, 360 A, 360; 432/195, 26, 102, 192, 14, 99, 248; 110/238; 65/346; 13/6

[56] References Cited

U.S. PATENT DOCUMENTS 3,897,202  7/1975  Ackermann et al. ............... 432/195
4,207,065  6/1980  Ackermann et al. ............... 432/195

Primary Examiner—Samuel Scott
Assistant Examiner—Lee E. Barrett
Attorney, Agent, or Firm—Becker & Becker, Inc.

[57] ABSTRACT

A device for heating open melting baths, especially galvanizing baths, enameling baths, lead coating baths, metal baths, and glass baths, and the like, in tubs, or vats or tanks, wherein an inert gas is circulated through components of the open baths which are closed toward the gas side which are in the form of shafts, and through a heater, whereby the gas is introduced into the fluid of the bath into vertical shafts, arranged on each longitudinal and/or end side of the tub, or vat or tank, the gas then bubbling through the fluid and being withdrawn through a withdrawal channel positioned above the shafts. There is provided at least one ceramic partition extending into the fluid, which partition forms at least part of the vertical shafts, and having at least one bore or a slot the upper end of which is in communication with the gas inlet conduit and the lower end of which opens into a pertaining vertical shaft or has provisions for directing the gas into the shaft.

9 Claims, 5 Drawing Figures

DEVICE FOR HEATING OPEN MELTING BATHS

The present invention relates to a device for heating open melting baths, such as galvanizing baths, enameling baths, lead coating baths, metallic baths, glass baths, and the like in tubs, or vats or tanks, wherein an inert gas is circulated through components of the open baths which are closed towards the gas side which are in the form of shafts or ducts and, as well, the gas is passed through a heater. For this, the gas is passed into the pertaining fluid through vertical shafts or conduit means arranged at each longitudinal and/or end wall of the tub, or vat or tank, is bubbled there through the pertaining fluid of the baths, and is withdrawn through a draft flue or withdrawing channel positioned about the shafts or gas introducing conduit means.

According to one prior art device, the inert gas is introduced into the pertaining fluid of the bath by passing through tubes or pipes which are positioned within the lateral shafts or conduit means, so as to rise in the pertaining fluid and thereby to agitate or circulate the pertaining fluid of the bath due to the air-lift pump principle.

Some of the aforementioned baths, for example galvanizing baths, increase on increase of the pertaining temperatures in aggressiveness or attack on the metal parts immersed in the bath, in a way that the useful life of the immersed metal parts is shortened to an uneconomical extent. When ceramic pipes are used which are immersed into the fluid of the bath, these pipes are required to have a considerable wall thickness in order to attain the required rigidity, since the fluid of the bath, having a high specific gravity, due to bubbling of the inert gas is constantly in a considerable state of motion or agitation. The relatively thick pipes, however, reduce the free or clear cross sectional area in the lateral ducts, so that thereby circulation due to the air-lift pump principle is reduced in the vertical parallel planes. This also means that the heat exchange effect between the warm inert gas and the pertaining liquid of the melting bath is limited.

It is an object of the present invention to provide a device for heating melting baths whereby, on the one hand, the parts which serve for the introduction of the inert gas into the pertaining fluid of the melting bath have a high service life, while, on the other hand, they are of the required rigidity or strength to withstand the actively moving fluid of the melting bath within the lateral shafts and, furthermore, to provide for a relatively large free or clear cross sectional area in the lateral ducts.

This object and other objects and advantages of the invention will appear more clearly from the following specification in connection with the accompanying drawings, in which.

Figures 1, 2, 3, 4, 5:
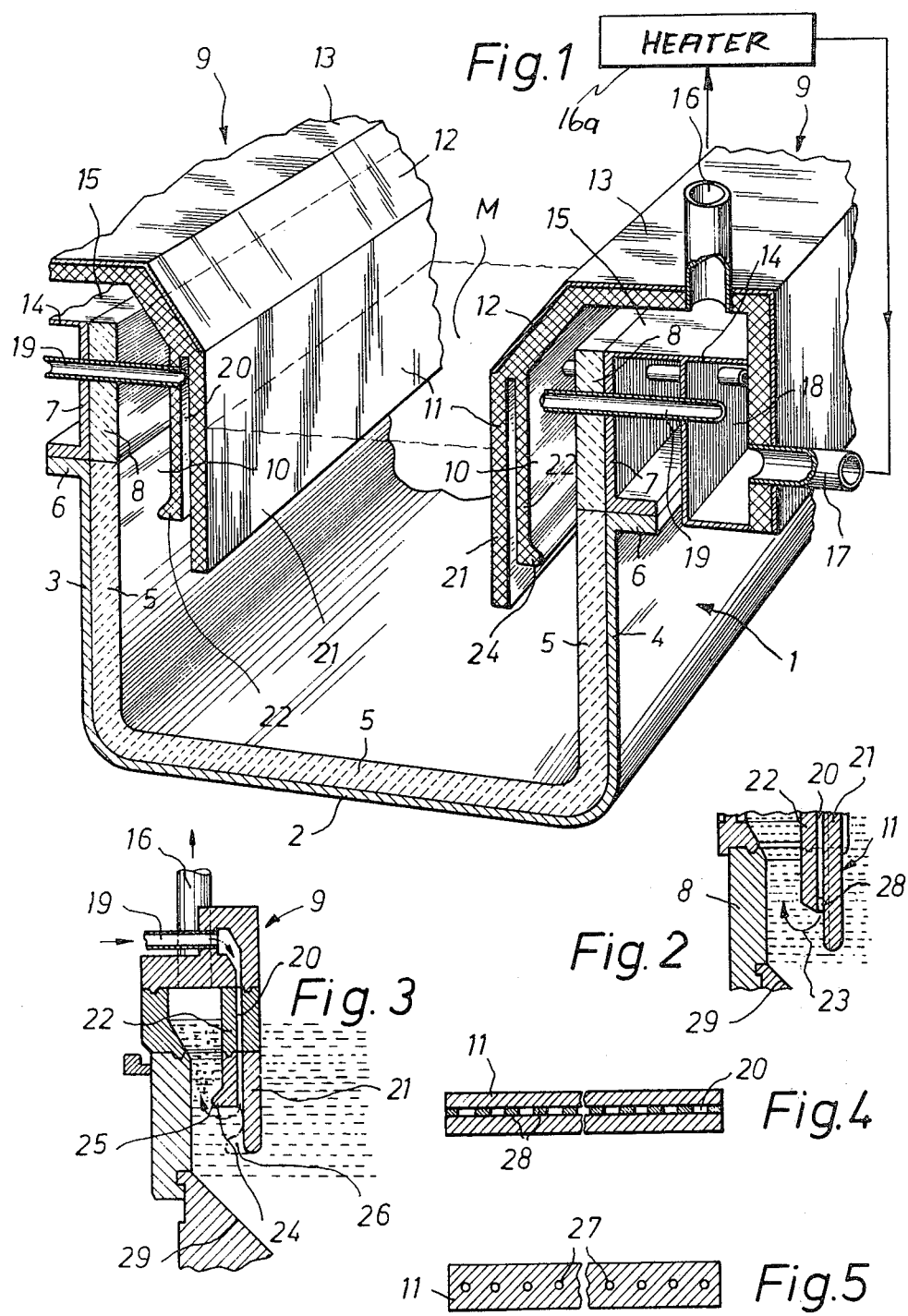
FIG. 1 is a diagrammatical representation, in perspective, of a vat, or tank or tub, partially shown in cross-section, particularly showing lateral longitudinal shafts or ducts.
FIG. 2 is a cross section of one embodiment of a duct or shaft according to the invention.
FIG. 3 shows a further embodiment of the duct wall between the central portion of the pertaining tub, or vat or container, and the shaft.
FIGS. 4 and 5 show, respectively, transverse cross sections through the duct wall between the central portion of the container and the shaft.

The device according to the present invention is characterized primarily in that at least one ceramic wall of the vertical ducts or shafts, immersed in the liquid of the pertaining melting bath is provided with at least one bore or slot or similar passage, the upper end of which is in communication with the pertaining gas inlet conduit means, while the pertaining lower end of the bore or slot opens in the vertical shaft, or is provided with means which introduce the gas into the shaft or conduit.

In accordance with another embodiment of the invention, the exit openings for the inert gas is directed toward the central portion of the container.

In accordance with yet another embodiment, the portion of the partition which is directed towards the central portion of the shaft penetrates less into the container than the portion of the partition which is positioned towards the central part of the container.

The ceramic partition or shaft forming wall which limits the vertical shaft in the direction towards the central portion of the tub or vat or container, or the duct wall extending parallel thereto, can be provided with a longitudinal slot or with a row of bores, whereby the portion of the partition which is directed towards the central portion of the shaft penetrates less into the container than the portion of the partition which is facing away from the vertical shaft, or which is facing towards the center of the container.

It is also possible that the lower end of the bore or of the slot is closed, whereby gas exit openings are provided near the lower end of the partition directed towards the central portion of the shaft.

In each case it is ensured that the inert gas to be passed into the pertaining melting fluid is enabled to reach the shaft, bubbles upwardly in the shaft, and it is avoided that the inert gas is moving towards the central portion of the container, where the articles to be treated in the pertaining fluid of the bath are immersed. The introduction of the inert gas into only one or several lateral ducts not only produces the aforementioned air-lift pump principle in these shafts or ducts and the continuous circulation of the fluid of the bath without mechanical means, but also ensures capture of the inert gas in the region above the one or several shafts in the removal channel or several removal channels, so that the gas is passed in a circulating manner to the heater and then again to the fluid of the bath.

In accordance with another embodiment of the invention, the slot or the row of bores are provided at their lower effective ends with means which divide the gas stream. Such means can be provided by sieve-like or screen-like ceramic plates so that the openings thereof can divide the gas stream, initially having a cross sectional extent corresponding to the cross sectional area of the slot or the bores, so that the inert gas stream divided into small bubbles rises through the fluid of the bath within the shaft or duct means and ensures a favorable heat exchange with the fluid of the bath.

In accordance with yet another embodiment, the portion of the ceramic partition or shaft-forming wall directed towards the interior of the shaft can be provided with a rib, projection, or the like for disrupting or breaking the gas flow.

In accordance with another embodiment the rib, projection, or the like, can be provided at the lower end of the portion of the partition which is directed towards the central portion of the shaft, whereby the gas stream on leaving the slot or the row of bores is deflected, through an angle of approximately 90°, to rise again in vertical direction upwardly and whereby it is divided into individual bubbles which circulate or rise upwardly through the fluid of the bath in the shaft or conduit means.

In accordance with yet another embodiment of the invention, the portion of the ceramic partition or shaft forming wall which is facing away from the central portion of the shaft is provided with a deflection bead or guide rib directed towards the central portion of the shaft. This guide rib or deflection bead can be arranged parallel to the rib or projection which diverts the gas stream, provided on the portion of the partition directed towards the central portion of the shaft, whereby it will be achieved that the gas stream is directed immediately on leaving the bore or the slot towards the central portion of the cross sectional area of the shaft or conduit means.

Referring now particularly to the drawings, FIG. 1 shows a container, designated by the numeral 1, such as a tub, or vat or tank, for galvanizing of a web-shaped metal band in a suitable bath. The container 1 includes a bottom wall 2 and two sidewalls 3 and 4 which are lined with a lining provided by a ceramic material. Flange portions 6 of the walls 3 and 4 receive the metallic component 7 with a ceramic lining 8 of a headpiece 9. The bottom wall 2 and the walls 3 and 4 and the components 7 provide the upwardly open container 1 into which the pertaining fluid of the bath can be filled for dipping thereinto of the article or articles to be treated.

The upper region of the walls 3 and 4 with pertaining linings 5 and the metallic components 7 with their pertaining linings 8 form the outer wall of a vertical shaft designated by the numeral 10 on each of the longitudinal sides of the container, each of the shafts being bounded towards the central portion M of the container 1 by pertaining vertical ceramic partitions 11 forming part of pertaining headpieces 9. The shaft 10 is downwardly open whereby the vertical partition 11 merges with an inclined wall portion 12 the continuation of which is provided by a horizontal wall portion 13 forming part of a pertaining headpiece 9. The horizontal wall portion 13 and the horizontal inner wall 14 provide the boundaries of a withdrawal channel designated by the numeral 15 which is in communication with a withdrawal conduit 16. The inert gas is withdrawn through the withdrawal conduit 16 from the device and is passed to a heater 16a in which the collected, cooled inert gas is heated to the required temperature for use. Reheated or warm inert gas is then passed through inlet conduit 17 to a distributor chamber 18. From the distributor chamber 18 the reheated inert gas is passed through conduits 19 into a vertical slot designated by the numeral 20 in the partition 11 of the shaft 10. The slot 20 extends approximately over the height and the length of the partition 11. The ceramic partition 11 of the shaft or conduit 10 is divided into a first portion or wall section 21 directed towards or into the central portion M of the container 1 and into a portion or wall section 22 facing away from the central portion M of the container 1, it being understood that the inlet conduit 17 can be directly in communication with the slot 20. As can be seen in FIGS. 1, 2, and 3, the portion 21 facing away from the central portion of the shaft 10 or, in other words, directed towards the central portion M of said container 1, of the partition 11 is downwardly longer than the wall section 22 which is directed towards the central portion of the shaft 10. Thus, the gas stream which is passed to the slot 20 at an overpressure, is guided out of the slot 20 in the direction of arrow 23 (FIG. 2) to the central portion of a shaft 10 where the gas stream rises upwardly and is then moving through the withdrawal channel 15 and passed through the withdrawal conduits 17 and reheated in the heater 16a so that in a circulatory manner the gas stream re-enters through conduits 17 and 19 into the slot 20. In a shaft 10 the gas stream rising in the direction of arrow 23 provides an airlift pump effect and a current or turbidity in the pertaining fluid of the bath which is generally circulatorily in the vertical planes.

Such a current turbidity or agitation and the heat exchanging effect between the gas stream and the fluid of the bath in the shaft 10 is substantially enhanced when the gas stream is subdivided into bubbles. For this, as is indicated in FIGS. 1 and 3, the portion or wall section 22 directed towards the central portion of the shaft 10 is provided at its lower end with a rib or reinforcing lip or bead 24 directed toward the interior of the shaft, by means of which the gas stream is disrupted or broken at the free edge 25 of the rib or reinforcing lip 24 whereby it is subdivided into small individual bubbles so as to increase circulation of the fluid in the shaft 10 and to increase or improve the heat exchange between the inert gas and the fluid of the bath in the slot 10.

Due to the provision of the slot 20 the interior volume or space of the shaft 10 is maintained free for the circulation of the fluids in the pertaining shaft.

In order to enhance the directing or guiding of the gas stream towards the interior or central portion of the shaft, there can be provided on the portion 21 directed away from the central portion of the shaft, or, in other words, facing the central portion end of the container 1, at its lower end a rib or bead 26 directed towards the central portion or interior of a conduit or shaft 10 and a guide surface 29 on lining 8.

In order to increase the rigidity of the partition 11 relative to the fluid which circulates, bubbles, or actively moves in the shaft 10, instead of the slot 20 there can be provided a row of bores or passages indicated by the numeral 27 (FIG. 5), whereby the row of bores can be in combination with the same embodiments of the lower ends of the partitions 21 and 22 as has been described with reference to FIGS. 1, 2, and 3, wherein the embodiments use a full slot 20. Instead of the row of holes or passages 27 the slot can also be subdivided by ribs or members 28 which are either as individual components connected to the portions 21 and 22, or formed as unitary components with one of the portions 21 or 22.

In contrast to the arrangement described above of the slot 20 or of the row of holes or passages 27 in the partition 11 or additionally thereto a slot or a row of passages or holes can be provided in the ceramic linings 5 and 8 of the side walls 3 or the metallic components 7. For this, then, the inlet conduit 17 or the conduit 19 is also in communication with such further slots or rows of holes, while the withdrawal chamber 15 is formed in the same or a similar manner, as indicated in FIG. 1.

The invention provides the advantage that as the introduction means for the inert gas into the fluid of the bath there is used a pertaining wall, made of ceramic material, of the shaft so that the free cross sectional area of the shaft is approximately maintained to the same extent as if thin-walled metallic tubes or pipes or conduits were used for introduction of the inert gas into the central portion or interior of the shafts, which metallic components, however, would only have a short effective service life in view of the corrosive or agressive fluid of the bath.

The present invention is, of course, in no way restricted to the specific diclosure of the specification and drawings, but also encompasses any modifications within the scope of the appended claims.

What we claim is:

1. A device for heating open melting baths, especially galvanizing baths, enameling baths, lead coating baths, metal baths, and glass baths, which comprises:
   a container having walls and adapted to receive a melting bath;
   distributor chamber means arranged laterally of said container and passage means for communicating said distributor chamber means with a bath in said container;
   inlet conduit means leading into said distributor chamber means for conveying a gas thereto;
   withdrawal channel means also arranged partially within said container for receiving cooled gas from a bath in said container, said withdrawal channel means comprising at least one vertical ceramic partition spaced inwardly from said container walls and a wall overlying said container walls and attached to said partition, at least a portion of said passage being defined within said partition;
   a heater in communication with said inlet conduit means; and
   withdrawal conduit means for communicating said withdrawal channel means with said heater.

2. A device according to claim 1, wherein that end of said passage means which communicates with the bath extends vertically into said container.

3. The device according to claim 1 further including means adjacent the passage to direct gas emerging from the passage toward the withdrawal chamber.

4. The device according to claim 1 wherein the partition includes first and second sections, the first section being between the container wall and second section; wherein the second section extends downwardly deeper into the tank than the first section, and wherein the first section has means thereon which extend laterally into the withdrawal chamber toward one of the container walls, whereby gas emerging from the passage is directed into the withdrawal chamber.

5. The device of claim 4 further including a surface projecting inwardly from the container wall beneath the withdrawal chamber and passage for directing the gas from the passage into the withdrawal chamber.

6. The device of claim 1 wherein the passage means is a slot having a closed end and an open end in the partition which slot is connected to the distributor chamber by connecting means at the closed end and extends down into the bath with the open end within the bath.

7. The device of claim 6 further including members spaced in the slot adjacent the open end thereof to subdivide the gas stream flowing out of the slot.

8. The device of claim 4 further including means projecting from the second section beneath the passage and toward the distributor chamber for disrupting the flow of gas from the passage.

9. The device of claim 1, 3, 4, 5 or 8 wherein the passage is formed by a row of spaced bores.

* * * * *